June 12, 1928.  J. A. AMOS  1,673,035
SIGNAL LAMP
Filed July 11, 1925
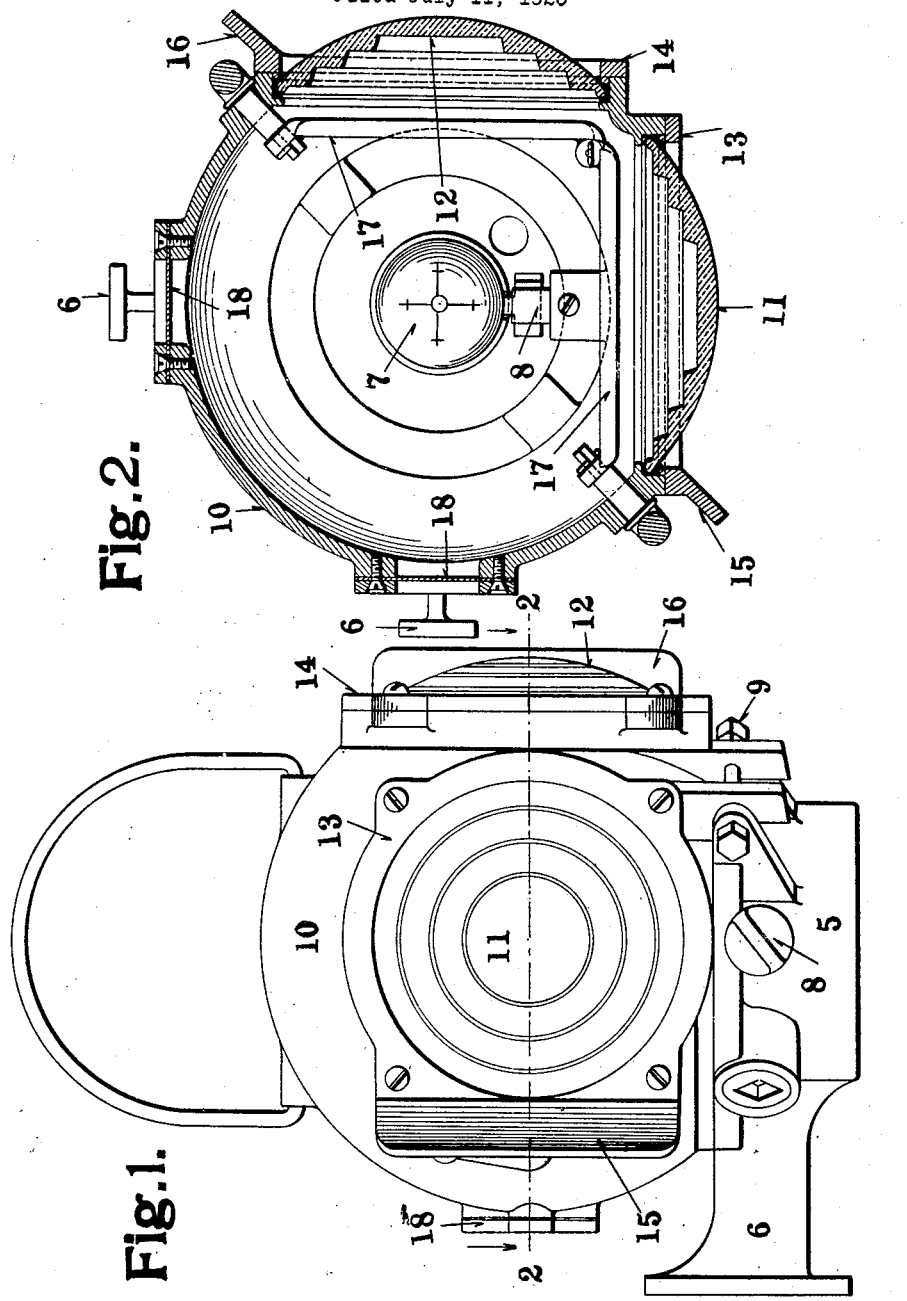
INVENTOR
JOHN A. AMOS
BY E. E. Huffman
ATTORNEY Patented June 12, 1928.

1,673,035

UNITED STATES PATENT OFFICE.

JOHN A. AMOS, OF ST. LOUIS, MISSOURI, ASSIGNOR TO OLIVER ELECTRIC AND MANUFACTURING COMPANY, OF ST. LOUIS, MISSOURI, A CORPORATION OF MISSOURI.

SIGNAL LAMP.

Application filed July 11, 1925. Serial No. 42,892.

My invention relates to a signal lamp and particularly to what is known as a classification lamp used in railway service. Such lamps are provided with two lenses positioned in planes at right angles to each other, and it is required that both lenses be visible from a position directly in front of the lamp. This is usually accomplished by allowing the convex faces of the lenses to project beyond the body of the lamp. I have found, however, that with the construction described, instances have occurred in which the engineer confused the light coming from the lenses visible to him with a light signal ahead when they happened to be in line with his eye and read the controlling signal as green instead of its actual color of yellow.

The object of my invention is to provide means for preventing the engineer, or others engaged in the operation of railway trains, from receiving such phantom signals with the consequent danger of collisions and other accidents. I achieve this object without interfering with the proper observation of the lamp lenses from the front.

In the accompanying drawings, which illustrate one form of lamp made in accordance with my invention, Figure 1 is a front elevation, and Figure 2 is a section taken on the line 2—2 of Figure 1.

The base of the lamp indicated at 5 is provided with the usual T brackets 6 for securing it in position and carries the light bulb 7 controlled by the key 8. Hinged to the base at 9 is the body 10 preferably approximately spherical in form. Two signal lenses 11 and 12 are secured in the body by holders 13 and 14. The convex faces of the lenses project beyond the body so that, for example, the lens 12 can be seen when the observer is directly in front of the lens 11. The holder 13 is provided on its left side with an integral wing 15 and the holder 14 on its right side with a similar wing 16. These wings form guards for screening the lenses from view from the rear. Within the body is a pivotal color screen 17 which may either be situated before the lenses 11, 12, as shown in Figure 2, or reversed to cover the small glazed openings 18 which are arranged opposite the lenses.

Having fully described my invention, what I claim as new and desire to secure by Letters Patent of the United States is:

1. In a classification lamp, the combination with a body, of a pair of signal lenses carried by said body at substantially right angles to each other, a light opening in the body opposite each lens, a movable color screen in said body adapted to cooperate either with the lens or the opening, and a guard between one of said lenses and the adjacent light opening, said guard projecting beyond the lens so as to obstruct the view of the lens from the rear.

2. In a classification lamp, the combination with a body, of a pair of signal lenses carried by said body at substantially right angles to each other, a light opening in the body opposite each lens, a movable color screen in said body adapted to cooperate either with the lens or the opening, and a pair of guards, one between each lens and adjacent light opening and projecting beyond the lens so as to obstruct the view of the lens from the rear.

In testimony whereof, I hereunto affix my signature, this 8th day of July, 1925.

JOHN A. AMOS.